April 19, 1938. J. T. KILBRIDE ET AL 2,114,364

BURRING TOOL

Filed Feb. 28, 1936

INVENTORS
John T. Kilbride and
Edward W. Carpenter
By Wooster & Davis ATTORNEYS.

Patented Apr. 19, 1938

2,114,364

UNITED STATES PATENT OFFICE 2,114,364

BURRING TOOL

John T. Kilbride, Stratford, and Edward W. Carpenter, Fairfield, Conn., assignors to The E. W. Carpenter Manufacturing Company, Bridgeport, Conn., a corporation of Connecticut Application February 28, 1936, Serial No. 66,224

6 Claims. (Cl. 90—24)

This invention relates to new and useful improvements in tools and has particular relation to a burring tool.

An object of the invention is to provide a tool adapted for rapidly removing burrs and the sharp corners at the edges of plates or other pieces irrespective of whether they have straight, curved or irregular edges.

Another object is to provide a tool as specified and which is easy to operate, of light weight, of simple and durable construction and which includes means protecting the hand of the operator from injury while using the tool.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
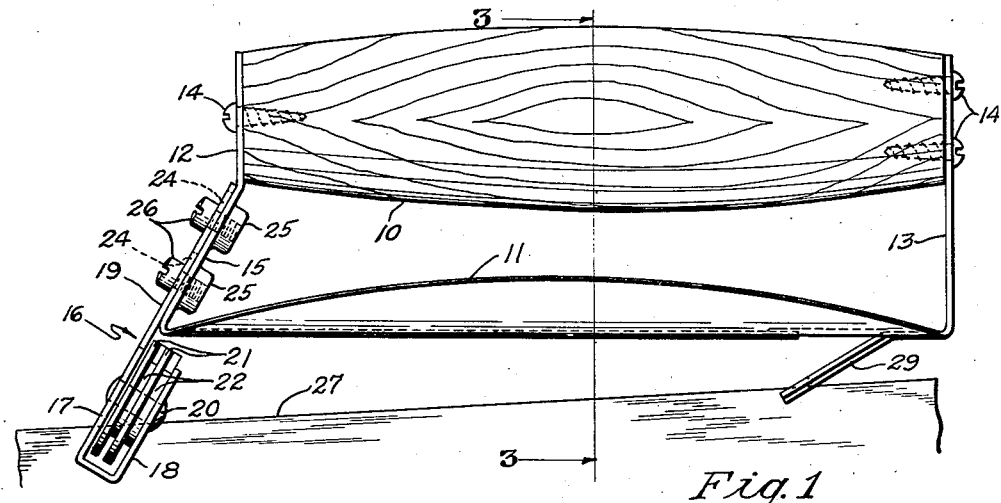
Fig. 1 is a side elevational view of the tool showing the same positioned for the burring of the edge of a plate.
Figure 2:
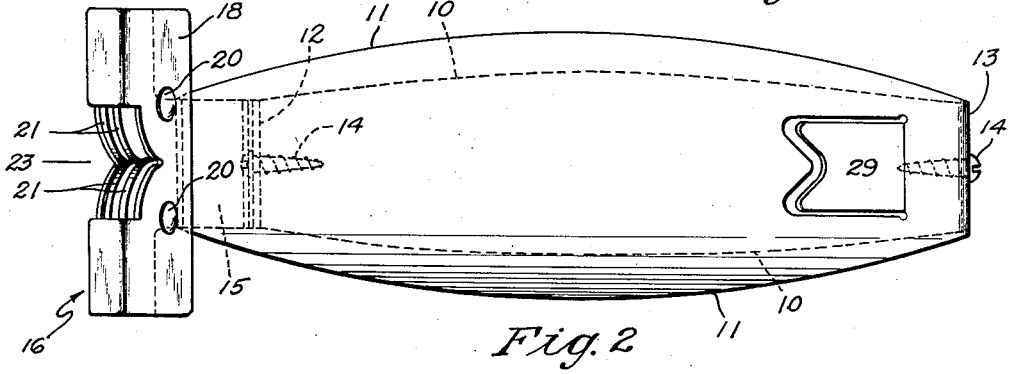
Fig. 2 is a bottom plan view of the tool.
Figure 4:
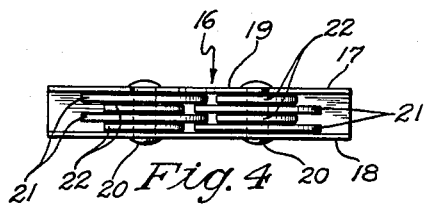
Fig. 4 is a top plan view of a cutter unit employed.

Referring in detail to the drawing the present burring tool comprises an elongated handle or grip 10 shown as a transversely circular piece of wood tapered toward its respective ends. However, it is to be understood that the handle may be of other material as found most convenient. A transversely arcuate guard 11 is secured to the ends of the handle by means of end straps 12 and 13 shown as integral with the guard, and these straps secure the guard in a position extending longitudinally of but spaced from the handle so that when the handle is being gripped, as when in use, the fingers of the operator are protected by the guard, the guard preventing the operator's hand coming in contact with the metal which is being burred or sharp edges being removed. Any suitable means as for example the screws 14 may be used to secure the end straps 12 and 13 to the handle 10 and it is noted that the guard extends laterally beyond the handle. The guard with the straps 12 and 13 may be formed from heavy sheet metal.

The front end strap 12 includes a portion 15 arranged at an obtuse angle to the handle, and due to the incline the outer or free end of strap portion 15 is disposed in advance of the front end of the handle. A cutter unit generally designated 16 is secured to the inclined strap portion 15. Such unit comprises a frame including spaced walls 17 and 18 and a flat tongue-like extension 19 carried by one of said walls. This frame may be stamped and shaped from heavy sheet metal. Passing through and mounted by the walls 17 and 18 are a pair of pins or rivets 20 each, between the walls, mounting hardened discs 21 and spacers or separators 22. The arrangement is such that the discs on one pin overlap those on the other thereof, and while two discs are shown on each pin it will be clear that the number may be varied, and fixed cutters may be used instead of the discs if preferred.

Figure 5:
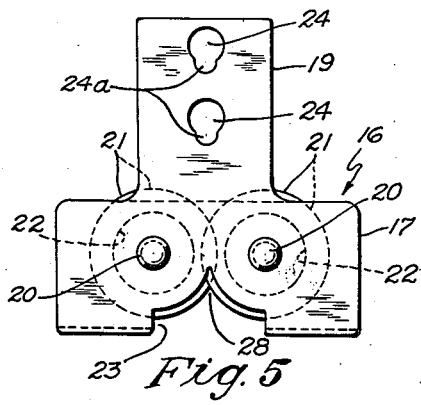
Fig. 5 is a front elevational view of the cutter unit.

A portion of the frame of the cutter unit is cut away providing an opening 23 with relation to which the discs are so disposed as to have portions exposed through said opening for use from both sides of the frame. Frame extension 19 is provided with a pair of keyhole openings 24 (see Fig. 5) and in correspondingly spaced relation a pair of lugs 25 are provided on the rear or underside of the inclined strap portion 15, and screws or headed studs 26 passing through the said strap portion are threaded into said lugs. The enlarged portion of the keyhole openings 24 are sufficiently large to pass the heads of screws 26 while the smaller portions 24ᵃ are insufficient to pass said head and are adapted to receive the shanks of the screws.

The cutter unit is secured to the strap portion 15 by disposing the extension 19 against said strap portion with the smaller ends 24ᵃ of the keyhole openings 24 under the heads of the screws 26 and then tightening such screws. When using the tool to remove a burr and bevel the edge of a plate, as for example the plate 27 of Fig. 1, the handle is held to dispose the cutters one at each side of the edge of the plate. In effect the cutters straddle the edge of the plate one cutter 21 being disposed at each of its sides. This disposes the edge of the plate in the notch 28 formed where the cutters begin to overlap and then as the cutters are drawn along the edge of the plate by manipulation of the handle 10 the cutters scrape or cut the burrs from the plate, and may also bevel its edges if desired.

Figure 3:
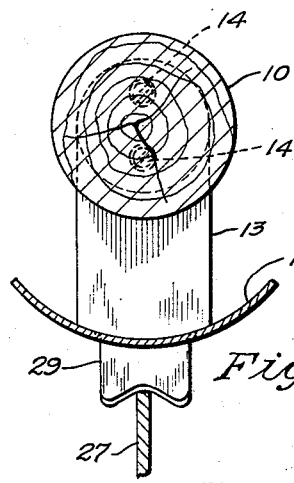
Fig. 3 is a transverse sectional view taken substantially along the line 3—3 of Fig. 1.

The cutters are inclined with respect to the handle and therefore if the handle is held parallel to the edge of the plate or other piece and drawn along a shearing cut is obtained. Toward the rear end strap 13 a portion 29 is lanced and pressed from the guard. Such portion has its outer end in inverted V-shape or notched, and the portion is arranged at an incline and comprises a guide adapted to straddle the edge being trimmed as shown in Figs. 1 and 3.

It will be clear that on loosening the screws 26 the cutter unit may be removed from the device since the large portions of the keyhole openings 24 are of a diameter to pass over the heads of the screws 26. Therefore when a cutter unit has been dulled to the point where it is no longer of value it may be removed and a new unit substituted for it. Attention is also called to the fact that a unit may be applied with either the wall 17 or the wall 18 as its forward wall, and it will therefore be understood that when one set of edges of cutters or discs 21 become dulled the unit may be removed from the device and applied in reversed position presenting the other edges of the cutters for use.

The present tool is particularly adapted for removing the burrs from and beveling the edges of metal plates, although it is also useful for removing the sharp edges of molded plastic pieces, such for example as "bakelite" and the like, or of wood or any other material that can be worked on with a file. The tool may be used on small or large pieces of work and irrespective of whether or not the edges being cleaned are irregular, straight or curved. With the present tool the edges of pieces may be rapidly cleared of burrs and the sharp edges of the pieces may also be rapidly removed thus doing away with the slow operation of filing. The guard 11 will protect the hand of the user from injury by coming in contact with the work.

Having thus set forth the nature of our invention, what we claim is:

1. A tool for removing burrs from the edges of a member comprising an elongated handle, a sheet metal guard spaced from and extending longitudinally of the handle at one side thereof, laterally extending straps at the ends of the guard for securing it to the handle, a cutter located at one end of the guard at the opposite side of the guard from the handle in position to be drawn over an edge, and an integral lug cut from and bent outwardly from the guard adjacent its other end to engage the edge to form a guide, the end of the lug being notched to straddle said edge.

2. A tool for removing burrs from a sharp metal edge comprising an elongated handle, a guard comprising an integral piece of sheet metal having a body portion extending at one side of and spaced from the handle to form a hand guard between the handle and the edge being operated upon, said guard including straps at the ends of the body secured to the handle to mount the guard thereon, a cutter unit including a cutter means adapted when drawn over a metal edge to remove the burrs therefrom, and means for securing the cutter unit to one of the end straps including a headed stud on the strap and an extension on the cutter unit having a keyhole opening to receive said stud to detachably secure the unit to the guard, and said cutter means extending from the opposite side of the guard to that of said handle.

3. A tool for removing burrs from the edges of a member comprising an elongated handle, a hand guard spaced from and extending longitudinally of the handle at one side thereof so as to be between the handle and the edge being operated upon, end straps connecting the guard to the handle, a cutter secured to the guard in position to be drawn over the edge, and a guide on the guard spaced from the cutter and having a notched edge to straddle the edge being operated upon.

4. A tool for removing burrs from the edges of a member comprising an elongated handle, a guard extending longitudinally at one side of and spaced from the handle to form a hand guard between the handle and the edge being operated upon, a cutter means extending beyond the guard at the opposite side of the guard from the handle in position to be drawn over an edge, and a guide on the same side of the guard with the cutter located in alignment with and spaced from the cutter means and having a notched edge to straddle the edge being operated upon and guide the cutter means along said edge.

5. A tool for removing burrs from the edges of a member comprising an elongated handle, a sheet metal guard spaced from and extending longitudinally of the handle at one side thereof to form a hand guard between the handle and the edge being operated upon, a cutter unit comprising a frame including spaced walls and an extension, cutters comprising discs mounted between said walls with their edges in overlapping relation and partially exposed for use, means connecting said frame extension with the handle whereby the handle may be used to draw the cutters along the edge to be operated upon, and said means including means to removably secure the frame to the handle with either wall foremost so that the position of the unit may be reversed to use either side of the cutters.

6. A tool for removing burrs from the edges of a member comprising an elongated handle, a sheet metal guard spaced from and extending longitudinally of the handle at one side thereof to form a hand guard between the handle and the edge being operated upon, laterally extending straps at the ends of the guard for securing it to the handle, and a cutter located at one end of the guard at the opposite side of the guard from the handle in position to be drawn over the edge to be operated upon.

JOHN T. KILBRIDE.
EDWARD W. CARPENTER.